(12) United States Patent
Dennis

(10) Patent No.: US 8,087,435 B2
(45) Date of Patent: Jan. 3, 2012

(54) TURBULENT FLOW CONTROL DEVICE FOR FUEL FILLER PIPE

(75) Inventor: Thomas S. Dennis, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 596 days.

(21) Appl. No.: 12/256,836

(22) Filed: Oct. 23, 2008

(65) Prior Publication Data

US 2010/0101683 A1    Apr. 29, 2010

(51) Int. Cl.
*B65B 1/04* (2006.01)
(52) U.S. Cl. .......................................... 141/363; 141/290
(58) Field of Classification Search .................. 141/363, 141/44, 45, 52, 59, 95, 290, 4
See application file for complete search history.

(56) References Cited

U.S. PATENT DOCUMENTS

| | | | |
|---|---|---|---|
| 4,438,862 A | 3/1984 | Bona | |
| 5,529,084 A | 6/1996 | Mutsakis et al. | |
| 5,740,842 A * | 4/1998 | Maier et al. | 141/45 |
| 5,752,553 A | 5/1998 | Kmiecik et al. | |
| 5,992,465 A | 11/1999 | Jansen | |
| 6,405,767 B1 | 6/2002 | Marsala et al. | |

* cited by examiner

*Primary Examiner* — Davis Hwu
(74) *Attorney, Agent, or Firm* — Clifford B. Vaterlaus, Esq.; Emerson Thomson Bennett

(57) ABSTRACT

Devices and methods for filling fuel tanks are disclosed. Some embodiments include components that reduce the level of turbulence in a fuel stream thereby increasing its flow rate. In some embodiments such anti-turbulence components can include one or more parallel flow vanes for directing the flow of fuel through a fuel filler pipe in a manner that reduces turbulence. Other embodiments may include a vane attached to a bracket in a mouth of the fuel filler pipe for directing the flow of fuel through a bend in the pipe.

20 Claims, 4 Drawing Sheets

US 8,087,435 B2

TURBULENT FLOW CONTROL DEVICE FOR FUEL FILLER PIPE

I. BACKGROUND

A. Field

The present disclosure generally relates to devices and methods for controlling fluid flow in fuel filler pipes.

B. Description of the Related Art

Fuel filler pipes are intended to accept fuel from a dispenser nozzle and deliver it to a reservoir. Ideally, a pipe would permit the fuel to flow at least as fast as the dispenser delivers it, so that the fuel does not well up and overflow or spit back. Fuel filler pipes are often shaped with one or more bends to allow the pipes to fit around other structures in a vehicle. This may make directing the flow of fuel to the reservoir more difficult. It is known that flow rate may decrease as turbulence increases; therefore, it may be desirable to have a fuel filler pipe that reduces or eliminates turbulence in an incoming fuel stream. A variety of approaches have been used to address this problem in the past. For instance, in some cases an embossed spiral or rifling is added to an inner surface of the fuel filler pipe, which causes vortexing in the incoming fuel stream, thus reducing chaotic flow i.e. turbulence. In other cases, non-spiraled vanes are added to an inner surface of the fuel filler pipe thereby promoting a linear, non-vortexing, flow. In still other cases, a free-standing helical control surface is disposed within the fuel filler pipe, which results in vortexing flow.

The present disclosure describes devices and methods for directing the flow of fuel or reducing turbulence in an incoming fuel stream, which provide improvements over the prior art.

II. SUMMARY

Some embodiments of the present disclosure relate to a system for conveying fuel to a fuel reservoir, the system comprising: a fuel filler pipe having a mouth defining an opening for receiving a fuel dispensing nozzle, the mouth having a diameter that is larger than a diameter of a remainder of the fuel filler pipe; a bracket disposed inside the mouth of the fuel filler pipe, the bracket configured for holding the fuel dispensing nozzle when the nozzle is inserted in the mouth; and a vane attached to the bracket, wherein the vane is configured to be contacted by fuel from the fuel dispensing nozzle to direct the fuel as the fuel flows in the fuel filler pipe.

Another embodiment relates to a system for conveying fuel to a fuel reservoir, the system comprising: a fuel filler pipe having a mouth defining an opening for receiving a fuel dispensing nozzle, an end portion opposite the mouth for extending to the reservoir, and at least one bend between the mouth and the end portion; and a vane disposed in the fuel filler pipe upstream from the bend, the vane having an attachment portion and a fuel contacting portion; wherein the attachment portion is attached to the fuel filler pipe from within the mouth, and the fuel contacting portion extends downstream from the attachment portion to terminate in a free end; and wherein the fuel contacting portion is configured such that fuel dispensed from the nozzle contacts the fuel contacting portion to direct the fuel through the bend.

Still other embodiments relate to a method of conveying fuel to a fuel reservoir through a bend in a fuel filler pipe, the method comprising: providing a mouth defining an opening in the fuel filler pipe for receiving a fuel dispensing nozzle; positioning a bracket inside the mouth for holding the fuel dispensing nozzle; joining a vane to the bracket and positioning the vane to direct the fuel in the fuel filler pipe to improve the flow of fuel through the bend in the fuel filler pipe.

Other benefits and advantages will become apparent to those skilled in the art to which it pertains upon reading and understanding of the following detailed description.

III. BRIEF DESCRIPTION OF THE DRAWINGS

Embodiments of the present disclosure will be described in detail in this specification and illustrated in the accompanying drawings which form a part hereof and wherein:

FIG. 1 is a drawing of an embodiment comprising system for conveying fuel to a fuel reservoir;

FIG. 2 cross sectional view of the system of FIG. 1 taken from line 2-2;

IV. DETAILED DESCRIPTION

Figure 1:
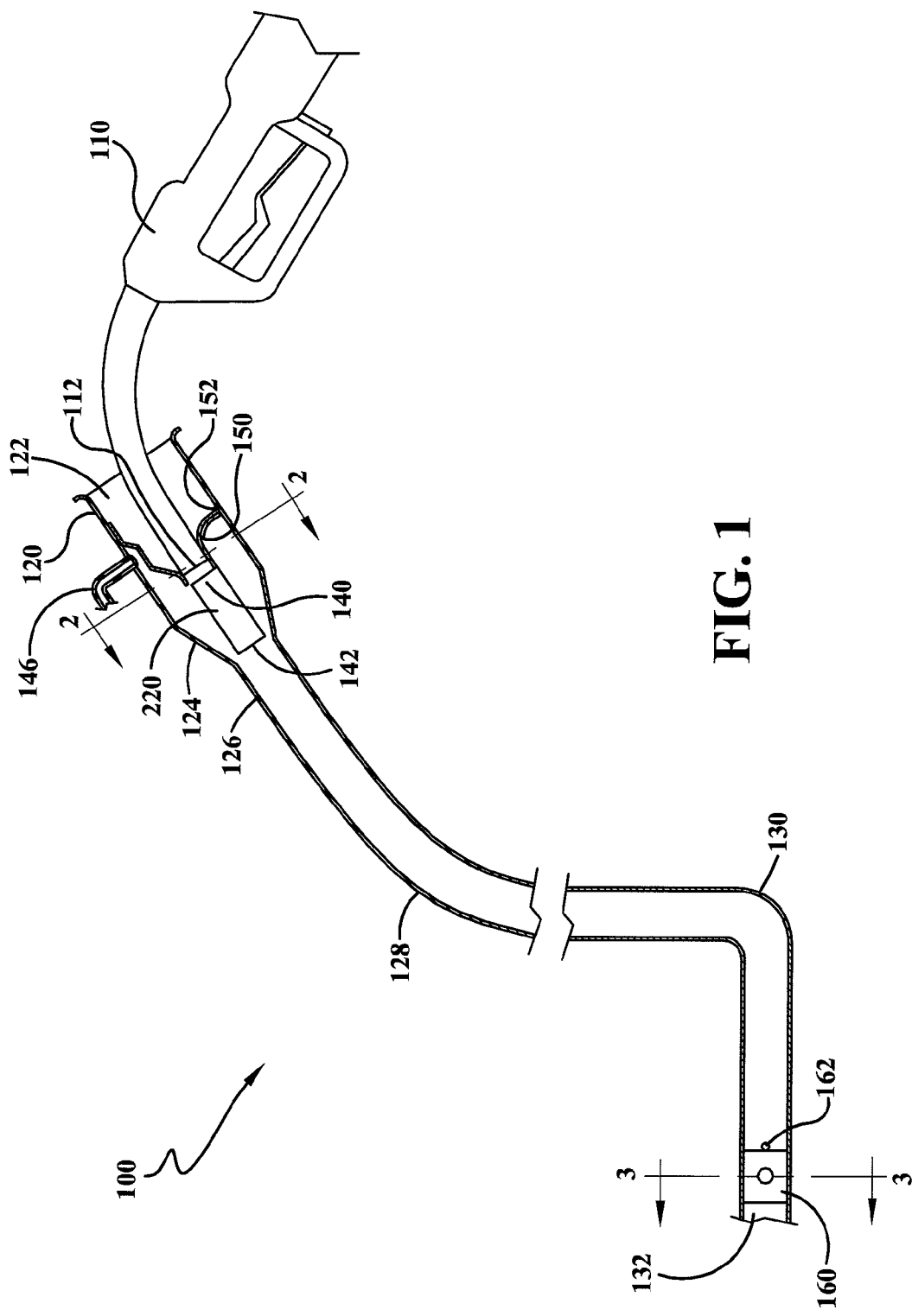

The present disclosure generally relates to devices for filling fuel tanks with liquid fuels. Some embodiments include one or more structures that enhance fuel flow rate by directing the flow of fuel or suppressing turbulence in a liquid fuel stream.

As used herein the term turbulogenic structure includes anything that slows a fuel flow rate below a predetermined acceptable level due to the structure creating, adding, enhancing or increasing turbulence in a flow stream. Turbulogenic structures can also include any structure that significantly contributes to the slowing of a flow rate below a predetermined acceptable level due to the structure creating, adding, enhancing or increasing turbulence in a flow stream.

As used herein, the term turbulence, and the various grammatical forms thereof, includes fluid flow characteristics that slow flow rate, or contribute to the slowing of flow rate, below a predetermined acceptable level. For instance, if a fluid flow field deviates from perfectly laminar and such deviation slows, or significantly contributes to the slowing of, the flow rate below a predetermined acceptable level, then the flow is turbulent for the purposes of the present disclosure. Accordingly, a fluid flow can be characterized herein as turbulent without regard to Reynolds number or other conventional metrics for describing turbulent flow.

Some turbulogenic structures may receive laminar or nearly laminar flow and expel turbulent flow. Furthermore, some turbulogenic structures may receive turbulent flow and add, enhance or increase turbulence therein. Examples of turbulogenic structures can include, without limitation, fuel dispensing nozzles, fuel input ports, fuel output ports, bends in the FFP, curvature of the flow path, morphological patterns and/or irregularities on an inner surface of the FFP or on any surface contacting a fluid flowing within the FFP, roughness of an inner FFP surface, or any deviation from a flat surface. Any of the foregoing structures, as well as others not specifically enumerated here, can be turbulogenic structures provided they significantly contribute to turbulent flow as defined herein.

Some embodiments include a fuel filler pipe (FFP) having a filling end, a first anti-turbulence device installed within the FFP downstream from the filling end, a turbulogenic structure downstream from the first anti-turbulence device, a second anti-turbulence device installed in the FFP downstream from the turbulogenic structure, and a linking structure for attaching the FFP to a fuel reservoir, such as a fuel tank. Some embodiments can include more than two anti-turbulence devices. For instance, some embodiments may include additional turbulogenic structures, each requiring an additional anti-turbulence device.

A fuel filler pipe (FFP) can take on any of a wide variety of forms. For example, in automotive applications, a fuel filler pipe can have a filling end adapted to accept an automotive fuel nozzle and can have a diameter and geometry suitable for accepting fuel at a predetermined flow rate from the nozzle. In some embodiments, the filling end of an FFP can comprise a mouth that is widened relative to the remainder of the FFP. Furthermore, the mouth can include a tapered portion linking the wide portion of the FFP to the narrow portion of the FFP. The mouth can also include a vent pipe or tube in vapor communication with the FFP and with the ambient atmosphere, thereby providing a path for displaced vapor to exit the FFP as fuel is added. According to some embodiments, an FFP can include one or more bends between the fuel filling end and the fuel tank.

Suitable FFPs can comprise a variety of materials known for fuel filling applications. For example, some FFPs can comprise materials selected from one or more of aluminum, steel, stainless steel, copper, or organic polymer. Some FFPs may have protective coatings such as, without limitation, galvanized pipe, or any of a variety of coated and/or plated pipe structures.

Suitable FFPs can have a diameter from about 0.25 inch to about 2 inches, for example. However, it will be understood that FFPs can have any other suitable diameter known to those skilled in the art.

The first anti-turbulence device can comprise a structure for receiving a fuel delivery nozzle. According to some embodiments the structure can comprise a bracket adapted to position the nozzle relative to the fuel filler pipe so that fuel flows smoothly from the nozzle to the pipe thereby mitigating or eliminating the creation of turbulent flow. The bracket can comprise a flow vane adapted to receive a fuel flow from a nozzle seated in the bracket and deliver the fuel flow to a fuel filler pipe in a predetermined direction. In some embodiments the flow vane can include an attachment portion adapted to attach to an inner surface of the FFP and/or mouth thereof. The flow vane can also comprise a free end at an opposite end relative to the attachment portion, and a fuel contacting portion for receiving and directing a fuel flow disposed between the free end and the attachment portion. In some embodiments at least a portion of the fuel contacting portion can comprise a semi-cylindrical cross section. The free end can be adapted to align with a portion of the FFP to smoothly transfer fuel thereto.

In some embodiments the nozzle, the flow vane, and the fuel filler pipe can form a substantially straight flow path. However, some embodiments can also include one or more bends in the fuel filler pipe at positions downstream from the bracket and flow vane. Accordingly, the flow vane is adapted to direct the flow of fuel from the nozzle to the fuel filler pipe in a manner that reduces or eliminates the creation of turbulent flow.

The second anti-turbulence device can be adapted to be installed at any point in a fuel filler pipe where turbulent flow needs to be mitigated or eliminated. Furthermore, any number of such second anti-turbulence devices can be installed in any given FFP. In some embodiments a second anti-turbulence device can comprise a plurality of parallel flow vanes. Additionally, in some embodiments the gaps between the flow vanes can be uniform in size, but in other embodiments the gap size may vary. For instance, the vanes may be a distance "x" apart across one half of the cross section of the FFP, and 0.5x apart across the second half. Accordingly, fuel will flow more quickly through the wider spaced vanes and more slowly through the narrower spaced vanes, which imparts a non-linear flow to the fuel stream. Such a nonlinear flow can be used, for instance, to counteract the effect of passing the stream through a bend in the FFP, and thereby reduce turbulence.

In some embodiments, the parallel flow vanes, and/or the FFP, can be curved. For instance, spatial limitations may require the FFP to follow a non-linear path having one or more bends. Parallel flow vanes may be located in, and/or extend through, such a bend in an FFP while remaining parallel to each other and/or to a longitudinal axis of the FFP. In other embodiments, the parallel flow vanes can be disposed in a straight region of the FFP that is downstream from a bend. Furthermore, the flow vanes can be upstream from a bend, downstream from a bend, or both. For instance, some bends may have a first set of flow vanes upstream and a second set of vanes downstream.

Some embodiments also include one or more mechanical stops for positioning an anti-turbulence device. For example, an FFP can have a raised portion on an inner surface that is adapted to abut an anti-turbulence device. Accordingly, an embodiment can be assembled, in part, by inserting an anti-turbulence device into an FFP and pushing it through the FFP until it is stopped by the raised portion. In some embodiments, the FFP can then be bent as needed. A wide variety of mechanical stops can be appropriate for the present disclosure. For instance, some such stops can include, without limitation, a dimple on an inner FFP surface, a ledge, a taper. One of skill in the art will be able to select an appropriate mechanical stop without undue experimentation.

Referring now to the drawings, wherein the showings are for purposes of illustrating embodiments of the disclosure only and not for purposes of limiting the same, FIG. 1 is a drawing of an embodiment 100 comprising an FFP having a widened mouth portion 120 for receiving a fuel dispensing nozzle 112 of a fuel dispenser 110. In operation, the mouth portion 120 can accept a turbulent flow from the nozzle 112. The flow enters the mouth 120 at opening 122, and the flow may accrue additional turbulence due to the geometry of the mouth portion 120 and taper 124. Accordingly, the mouth 120 and taper 124 comprise a first turbulogenic structure. According to FIG. 1, the tapered portion 124 can be continuous with a first pipe section 126. The flow rate downstream from the taper 124 can be expected to be below a minimum acceptable value. Therefore, a first anti-turbulence device can be located in the first pipe section 126. The anti-turbulence device can be attached to the FFP by a bracket 150, which can be welded to an inner surface of the mouth portion 120 at a weld joint 152. A vent pipe 146 may be located in the mouth 120 for venting fumes in the FFP.

In further reference to FIG. 1, the first pipe section can be continuous with a first bend 128. In this embodiment, the first bend 128 defines an obtuse angle, which comprises a second turbulogenic structure. A second bend 130 can be located downstream from the first bend 128, and can define a right angle comprising a third turbulogenic structure. According to this embodiment, the contributions of the first bend 128 and the second bend 130 combine to form enough turbulence to lower the flow rate below a minimum acceptable level. Therefore, a second anti-turbulence device 160 can be located downstream from the second bend 130, and abuts mechanical stop 162. According to this embodiment, turbulent flow from the second bend 130 can enter the second anti-turbulence device 160, the turbulence is lessened therein, and less turbulent fuel can be expelled at the downstream end of the device 160 at a flow rate at or above a minimum acceptable value. The end 132 of the FFP is adapted to attach to a fuel tank. Thus, fuel is delivered to the tank at an acceptable flow rate.

Figure 2:
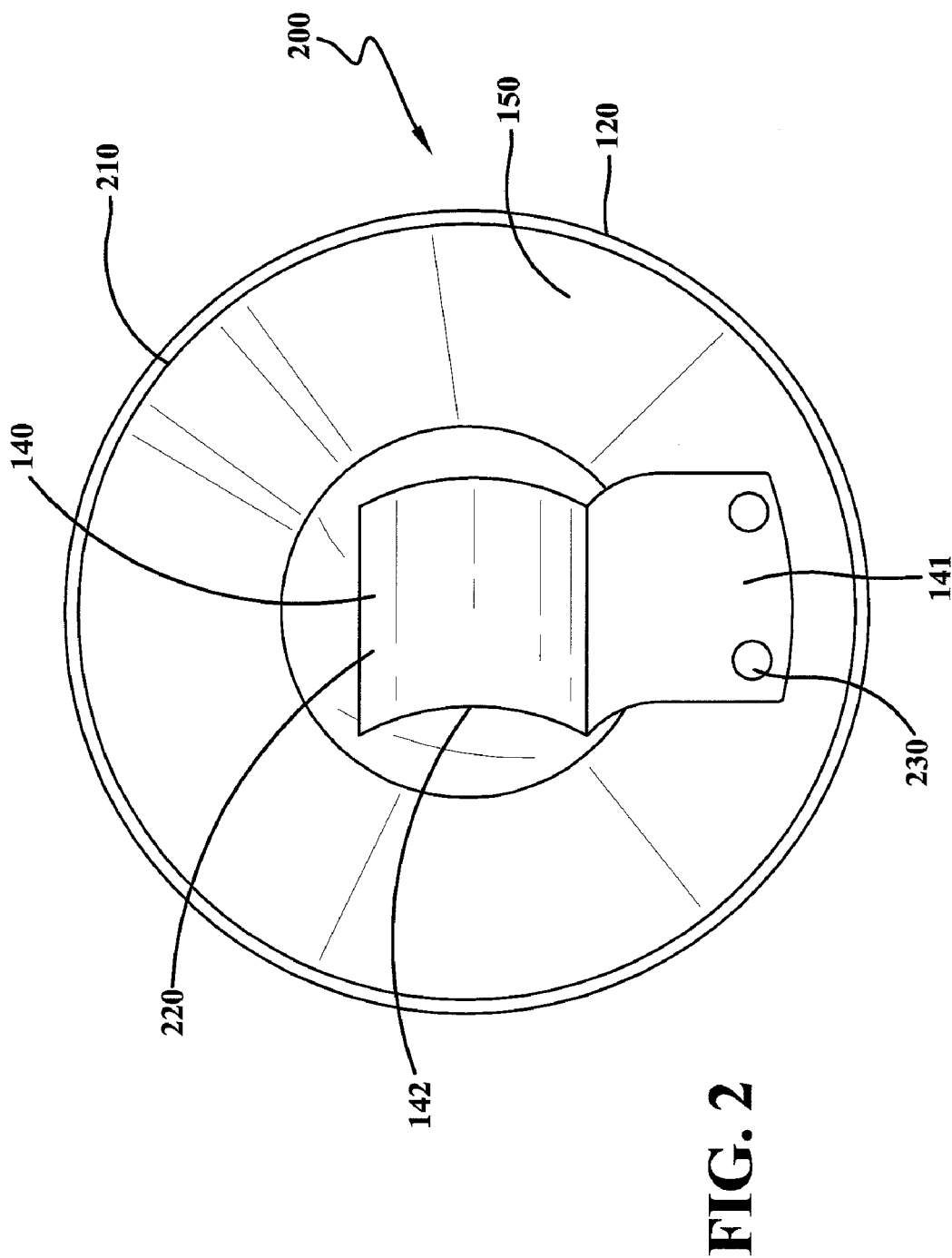

FIG. 2 is a drawing of the first anti-turbulence device 200 from an upstream perspective looking down a longitudinal axis of the device 200. The device 200 may include a bracket 150 for attaching to an inner surface of the FFP at the mouth 120. The bracket 150 may be configured to receive the nozzle 112 of the fuel dispenser 110 to hold the nozzle 112 in place within the mouth 120. It will be understood that the bracket 150 may have various different configurations within the scope of the present disclosure. The device 200 may also include a flow vane 220 for being contacted by fuel and directing the fuel through a bend or curve in the FFP. The flow vane may include an attachment portion 141 and a fuel contacting portion 140. One embodiment of the fuel contacting portion 140 may be curved to form a semi cylindrical wall. However, it will be understood that the fuel contacting portion may have various different shapes to guide the fuel as desired through the FFP. The fuel contacting portion 140 may extend downstream from the attachment portion 141 to terminate in a free end 142, as shown most clearly in FIG. 1. The attachment portion 141 may be attached to the bracket in any suitable manner known to those skilled in the art. One embodiment includes the attachment portion 141 of the flow vane 220 attached to the bracket 150 using weld joints 230. It will be understood that the flow vane 220 may be attached at any suitable position around the bracket 150, and that some embodiments may include a plurality of flow vanes 220.

Figure 3:
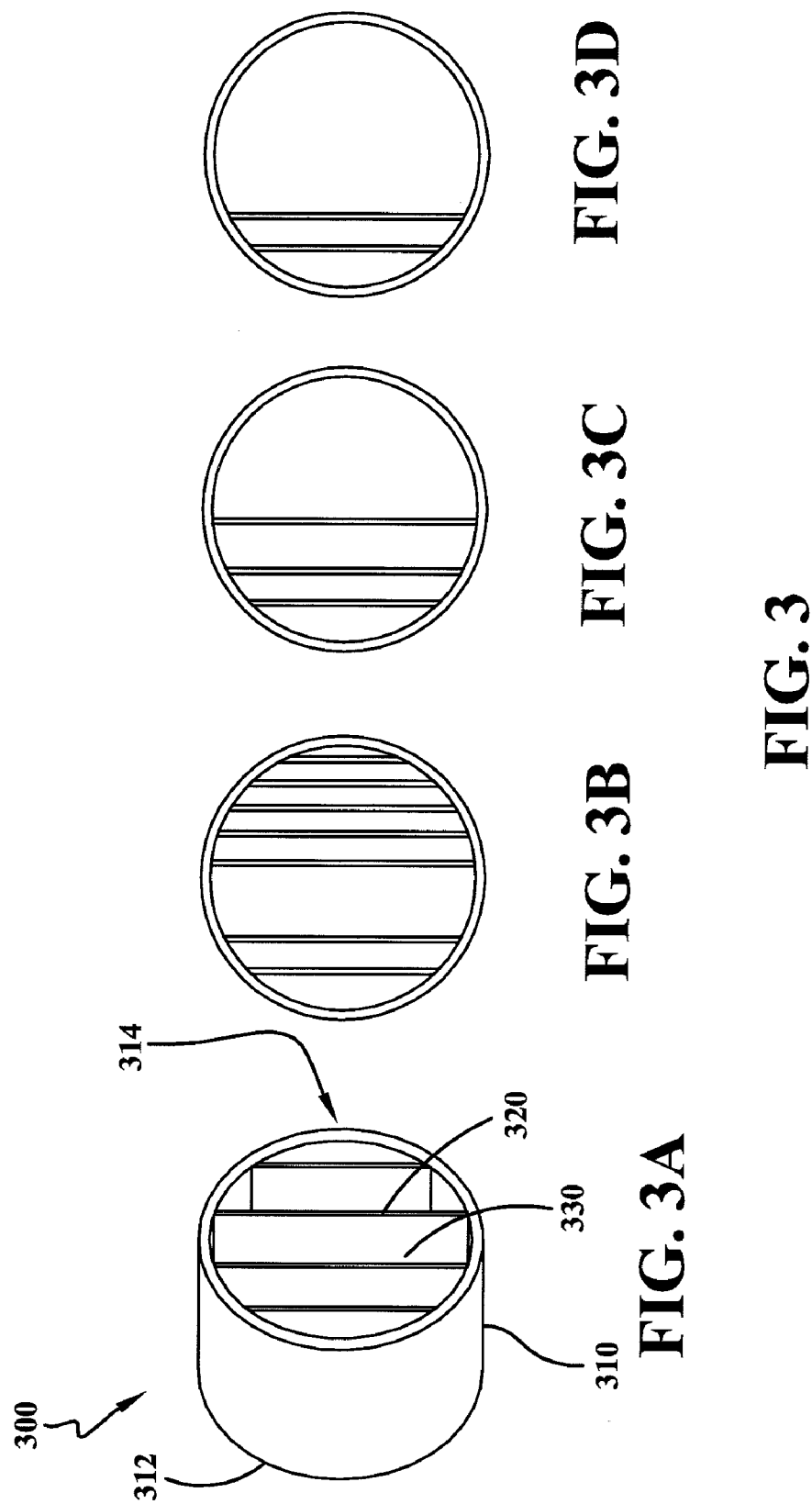
FIG. 3A is a perspective view of a second anti-turbulence device.
FIG. 3B is a cross-sectional view of a first alternative embodiment of the system of FIG. 1 taken from line 3-3.
FIG. 3C is a cross-sectional view of a second alternative embodiment of the system of FIG. 1 taken from line 3-3.
FIG. 3D is a cross-sectional view of a third alternative embodiment of the system of FIG. 1 taken from line 3-3.

It will be appreciated that one feature of the present disclosure allows fuel to be controlled in the FFP where the FFP is curved in any direction. The configuration of the flow vane 220 can be designed to improve flow for a particular curvature of the FFP, whereas the bracket 150 in the FFP can be the same for FFPs having various different bend configurations. Moreover, flow vanes 220 can be installed on existing filler pipe designs so that the configuration of the FFP itself does not need to be modified to enhance fuel flow. FIG. 3 is a drawing of an optional second anti-turbulence device 300 having an upstream end 314 and a downstream end 312. The device 300 can include an outer wall 310 enclosing a plurality of flow vanes 320. Each of the flow vanes can be spaced apart from the others and define gaps 330. The gaps 330 can be uniform in size or can vary according to a predetermined pattern. One of skill in the art will be able to select a proper gap size and spacing pattern without undue experimentation. FIGS. 3A, 3B, 3C and 3D each show alternative gap sizes and spacing patterns; however, one of skill in the art will recognize that a variety of other sizes and patterns can also be acceptable depending upon the specific application.

Figure 4:
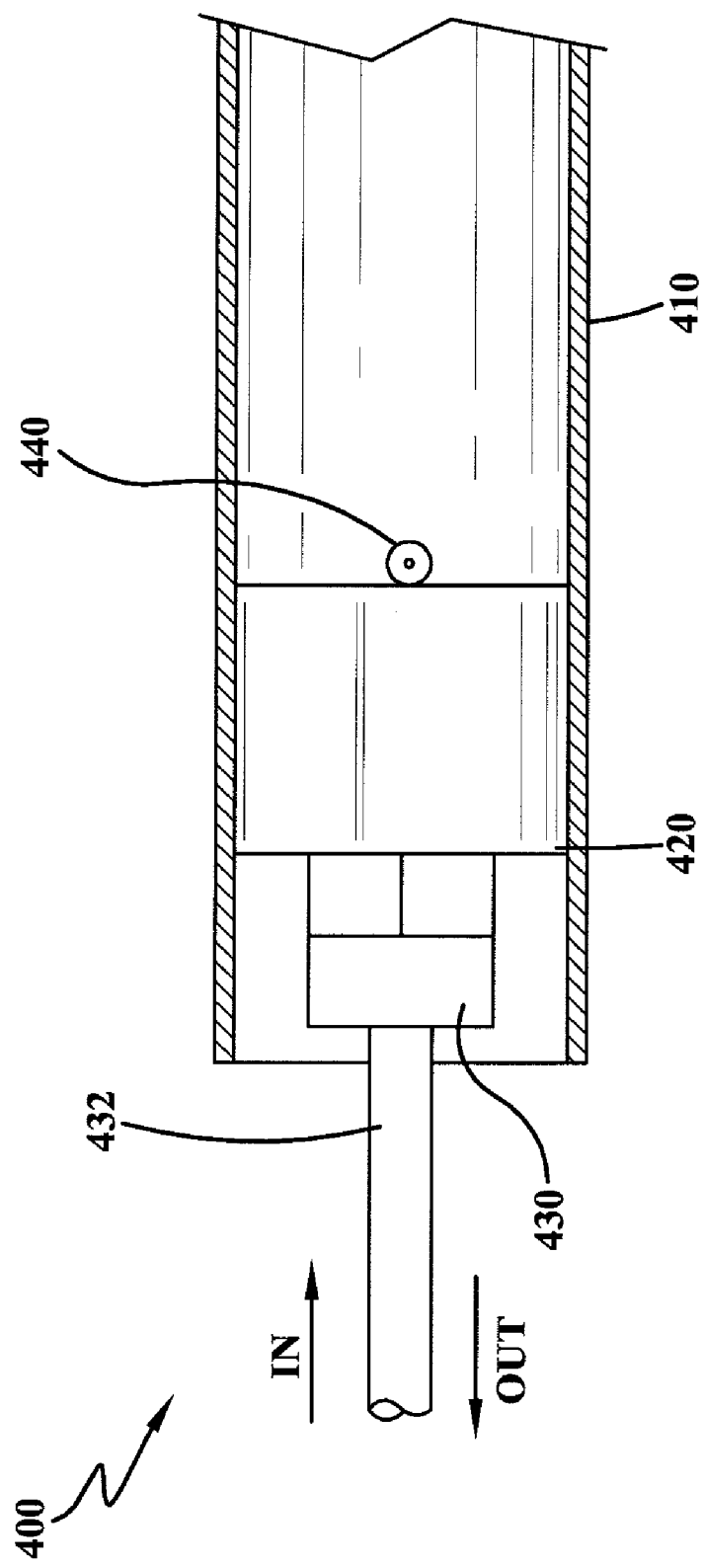
FIG. 4 is an illustration of a method for assembling a fuel filler pipe having an anti-turbulence device therein.

FIG. 4 is an illustration of one way to assemble an FFP embodiment 400 according to the present disclosure. According to FIG. 4, an anti-turbulence device 420 is inserted into a pipe 410, and a shaft 432 and plunger 430 are used to drive the anti-turbulence device 420 into the pipe 410. Further according to FIG. 4, the anti-turbulence device 420 is driven down the pipe until it contacts a mechanical stop 440. In this embodiment, the mechanical stop 440 comprises a dimple on the inner surface of the pipe 410. Once the device 420 is properly positioned, the pipe 410 can be bent to the desired configuration.

Illustrative embodiments have been described, hereinabove. It will be apparent to those skilled in the art that the above methods and apparatuses may incorporate changes and modifications without departing from the general scope of this disclosure. It is intended to include all such modifications and alterations insofar as they come within the scope of the appended claims or the equivalents thereof.

I claim:

1. A system for conveying fuel to a fuel reservoir, the system comprising:
   a fuel filler pipe having a mouth defining an opening for receiving a fuel dispensing nozzle, the mouth having a diameter that is larger than a diameter of a remainder of the fuel filler pipe;
   a bracket disposed inside the mouth of the fuel filler pipe, the bracket configured for holding the fuel dispensing nozzle when the nozzle is inserted in the mouth; and
   a vane attached to the bracket, wherein the vane is configured to be contacted by fuel from the fuel dispensing nozzle before entering the fuel reservoir to direct the fuel as the fuel flows in the fuel filler pipe.

2. The system of claim 1, wherein the vane comprises an attachment portion and a fuel contacting portion, and wherein at least a portion of the fuel contacting portion is curved to form a semi cylindrical wall.

3. The system of claim 1, wherein the vane comprises an attachment portion and a fuel contacting portion, and wherein the vane is attached to the bracket such that the fuel flows in a substantially linear path from the attachment portion toward the fuel contacting portion.

4. The system of claim 1, wherein the vane comprises an attachment portion and a fuel contacting portion, and the fuel contacting portion extends downstream from the attachment portion to terminate in a free end.

5. The system of claim 1, wherein the mouth comprises a taper in which the diameter of the mouth reduces in a direction away from the opening.

6. The system of claim 1, further comprising a vent pipe disposed on the mouth of the fuel filler pipe.

7. The system of claim 1, wherein the vane is a first anti-turbulence device, the system further comprising a second anti-turbulence device disposed in the fuel filler pipe downstream from the vane.

8. The system of claim 7, wherein the second anti-turbulence device comprises a plurality of spaced apart vanes.

9. The system of claim 1, wherein the fuel filler pipe comprises at least one bend.

10. The system of claim 1, wherein the bracket is welded to an inner surface of the mouth portion.

11. The system of claim 10, wherein the vane is welded to the bracket.

12. A method of conveying fuel to a fuel reservoir through a bend in a fuel filler pipe, the method comprising:
   providing a mouth defining an opening in the fuel filler pipe for receiving a fuel dispensing nozzle;
   positioning a bracket inside the mouth for holding the fuel dispensing nozzle;
   joining a vane to the bracket and positioning the vane to direct the fuel in the fuel filler pipe before entering the fuel reservoir to improve the flow of fuel through the bend in the fuel filler pipe.

13. The method of claim 12, further comprising positioning the vane to contact the fuel to change a direction of flow of the fuel through the bend.

14. The method of claim 12, wherein the vane is a first anti-turbulence device, the system further comprising providing a second anti-turbulence device downstream from the vane, wherein the second anti-turbulence device comprises a plurality of spaced apart vanes.

15. The method of claim 14, further comprising the step of inserting the second anti-turbulence device into the fuel filler pipe with a plunger.

16. The method of claim 15, wherein the step of inserting the second anti-turbulence device into the fuel filler pipe with a plunger, comprises the step of driving the second anti-turbulence device into the fuel filler pipe until it contacts a mechanical stop.

17. The method of claim 16, further comprising the step of providing the mechanical stop on the inner surface of the pipe.

18. The method of claim 12, further comprising joining an attachment portion of the vane to the bracket and extending a fuel contacting portion of the vane downstream from the attachment portion such that the fuel contacting portion terminates in a free end.

19. The method of claim 12, wherein the step of positioning a bracket inside the mouth for holding the fuel dispensing nozzle, comprises the step of welding the bracket to an inner surface of the mouth portion.

20. The method of claim 19, wherein the step of joining a vane to the bracket, comprises the step of welding the vane to the bracket.

* * * * *